United States Patent [19]
Wachi et al.

[11] Patent Number: 6,050,653
[45] Date of Patent: Apr. 18, 2000

[54] ELECTRICALLY CONTROLLED BRAKING SYSTEM

[75] Inventors: Yuzi Wachi; Toshiaki Fukushima, both of Saitama-ken, Japan

[73] Assignee: Jidosha Kiki Co., Ltd, Tokyo, Japan

[21] Appl. No.: 09/008,056

[22] Filed: Jan. 16, 1998

[30] Foreign Application Priority Data

Jan. 17, 1997 [JP] Japan .................................. 9-020101
Jan. 21, 1997 [JP] Japan .................................. 9-022196

[51] Int. Cl.⁷ .................................................. B60T 17/00
[52] U.S. Cl. ..................................... 303/113.4; 303/155
[58] Field of Search ................................ 303/3, 15, 20, 303/152, 155, 113.4, 114.1, 115.2, 116.1

[56] References Cited

U.S. PATENT DOCUMENTS

| | | | |
|---|---|---|---|
| 4,812,777 | 3/1989 | Shirai | 303/14 |
| 5,013,094 | 5/1991 | Nishi et al. | 303/52 |
| 5,333,944 | 8/1994 | Shirai et al. | 303/113.4 |
| 5,350,225 | 9/1994 | Steiner et al. | 303/113.4 |
| 5,531,509 | 7/1996 | Kellner et al. | 303/114.1 |
| 5,568,962 | 10/1996 | Enomoto et al. | 303/152 |
| 5,762,407 | 6/1998 | Stacey et al. | 303/155 |
| 5,779,328 | 7/1998 | Mergenthaler et al. | 303/122.12 |
| 5,833,327 | 11/1998 | Kozakai | 303/113.4 |
| 5,857,755 | 1/1999 | Aoki et al. | 303/152 |

FOREIGN PATENT DOCUMENTS 62-155162  7/1987  Japan .

*Primary Examiner*—Chris Schwartz
*Attorney, Agent, or Firm*—Flynn, Thiel, Boutell & Tanis, P.C.

[57] ABSTRACT

An electrically controlled braking system allows a pedal stroke produced by an operation of a brake pedal to be detected by a stroke sensor and to be input to a controller, which in turn controls a brake pressure generated by a brake pressure generator in accordance with the magnitude of the pedal stroke. A pedal reaction unit is added to the brake pressure generator. The pedal reaction unit comprises an air cylinder connected to the brake pedal, the stroke sensor which detects the pedal stroke, and a pair of solenoid operated open/close valves for feeding the air pressure from an air tank to, or displacing the air pressure from, the air cylinder. The controller causes the air to be fed to or displaced from the air cylinder in accordance with the magnitude of the pedal stroke detected by the stroke sensor, thus producing a pedal reaction having a controlled magnitude.

22 Claims, 18 Drawing Sheets

ELECTRICALLY CONTROLLED BRAKING SYSTEM

FIELD OF THE INVENTION

The invention relates to an electrically controlled braking system in which a brake pressure is electrically controlled by a controller in accordance with a stroke of a brake pedal or a force of depression applied to the brake pedal.

BACKGROUND OF THE INVENTION

In an electrically controlled braking system, a pedal stroke or a pedal depressing force driving brake pedal operation is detected by a sensor, and a controller controls the opening or closing of a solenoid valve or the like in accordance with a detection signal from the sensor to control a brake pressure generated by a brake pressure generator.

A variety of arrangements are known in the art for a brake pressure generator in which a brake pressure is generated as controlled by a controller. Several forms of the brake pressure generators which are commonly used in the art will be briefly described. FIG. 31 shows an example of a conventional liquid pressure braking system, a top portion of which illustrates a portion associated with rear wheels which are driving wheels, and a bottom portion of which illustrates a portion associated with front wheels which are driven wheels. When a brake pedal a is depressed, a liquid pressure is generated in a master cylinder b. For the front wheels, the liquid pressure is passed through a feed valve c to a wheel cylinder e, while for the rear wheels which are driving wheels, the liquid pressure is passed through a traction valve d and a feed valve c to a wheel cylinder e, thus actuating the brake.

The liquid pressure braking system is provided with an anti-skid braking subsystem (hereafter referred to as ABS) which regulates a brake pressure in order to prevent a tire lock during the actuation of the brake, and a traction control (hereafter referred to as TRC) which controls the brake pressure for the driving wheels in order to prevent a tire slip from occurring upon starting. If either wheel tends to be locked during the operation of the brake, such locking tendency of the wheel is removed by maintaining the wheel cylinder pressure by closing both the feed valve c and an exhaust valve f, by a decompressing control in which the feed valve c is closed while the exhaust valve f is opened to decompress the pressure, and by an intensifying control in which the feed valve c is opened while the exhaust valve f is closed to intensify the pressure. If a driving wheel tends to slip upon starting a vehicle, the tendency to slip is removed by closing the traction valve d and opening an open/close valve g to operate a pump h, thus controlling the feed valve c and the exhaust valve f associated with the wheel which tends to slip to apply a braking action to that wheel.

FIG. 32 shows an example of conventional air-over hydraulic brake, which is provided with ABS and TRC, in the similar manner as the liquid pressure braking system mentioned above. In this air-over hydraulic brake, as a brake pedal a is operated to actuate a brake valve j, an output pressure from the brake valve j is passed through an ABS modulator k to be fed to a brake actuator m for the front wheels (shown at the top portion of this Figure), while for the rear wheels which are driving wheels (shown at the bottom portion of this Figure), the output pressure from the brake valve j is passed through a double check valve n and an ABS modulator k to a brake actuator m where it is converted into a liquid pressure to be fed to a wheel cylinder p, thus actuating the brake.

If a wheel tends to be locked during the operation of the brake, the ABS modulator k is operated to remove the locking tendency of the wheel by maintaining the brake pressure, by displacing the air pressure from the brake actuator m to provide a decompression, or by feeding a pressure from an air tank q to the brake actuator m to provide an intensification. If a wheel tends to slip upon starting a vehicle, the tendency of the wheel to slip is removed by opening a traction valve r of that wheel which tends to slip to thereby allow the pressure from the air tank q to pass through the double check valve n and the ABS modulator k to be fed to the brake actuator m, thus activating the brake. The pressure fed to the brake actuator m is controlled by the ABS modulator k.

FIG. 33 shows an example of a conventional full air brake system. During a normal brake operation, as a driver operates a brake pedal a to operate a brake valve j, an output pressure from the brake valve j is passed through an ABS modulator k to be fed to a brake cylinder s, thus activating the brake for the front wheels, which are shown in the top portion of this Figure. For the rear wheels, the output pressure from the brake valve j is supplied as an indicator pressure for a relay valve t, which regulates an air pressure from a tank q in accordance with the indicator pressure to be fed through an ABS modulator k to a brake cylinder s, thus actuating the brake.

The full air brake of this example is provided with ABS, whereby if a wheel tends to lock during the operation of the brake, the ABS modulator k operates to remove the locking tendency of the wheel by maintaining the brake pressure, or providing a decompressing or intensifying control.

FIG. 34 shows an example of a conventional electrically controlled braking system, as disclosed in Japanese Laid Open Patent Application No. 155,162/1987, and which is provided with a full air brake pressure generator. An air tank q is connected to a brake cylinder s through a pressure control valve u, and when a brake pedal a is operated, a pressure transducer v connected to the brake pedal a converts the position of the brake pedal a into an electrical brake pressure signal, which is input to a controller w. The controller w switches the pressure control valve u in accordance with this signal, whereby an air pressure is fed from the air tank q to the brake cylinder s, thus generating a brake pressure.

It is recognized that there are three factors which determine a brake response, namely, a pedal depressing force, a pedal stroke and a deceleration (or brake pressure), a combination of which determines a brake feeling. To provide an optimum brake feeling, it is desirable if a relationship between a pedal depressing force and a pedal stroke and a relationship between a pedal depressing force or pedal stroke and a brake pressure, be optimally controlled.

However, in a conventional electrically controlled braking system, there is provided a stroke sensor which detects a pedal stroke or a depressing force sensor which detects a pedal depressing force so that the brake pressure can be controlled in accordance with either the pedal stroke or the brake depressing force. However, it has been impossible to control a relationship between the pedal stroke and the pedal depressing force, and accordingly, it has been difficult to provide a most preferred brake feeling.

OBJECT AND SUMMARY OF THE INVENTION

Accordingly, it is an object of the invention to provide an electrically controlled braking system which is capable of providing an optimum brake feeling by controlling the three factors, namely, a pedal depressing force, a pedal stroke and a brake feeling, which determine the brake response.

Above object is accomplished in an electrically controlled braking system which includes a brake pressure generator, means for detecting a stroke of a brake pedal or a brake depressing force, and control means for controlling a pressure generated by the brake pressure generator in accordance with an output signal from the detecting means, by the addition of a brake pedal reaction unit which produces a reaction corresponding to the stroke of the brake pedal or the brake depressing force in response to the operation of the brake pedal.

As mentioned above, in accordance with a first aspect of the invention, the provision of a pedal reaction unit which imparts a pedal reaction in accordance with the operation of the brake pedal in the electrically controlled braking system allows the relationship between the pedal stroke and the pedal depressing force to be controlled, thus allowing all of the three factors, namely, the pedal reaction (depressing force), the pedal stroke and the brake pressure which determine the brake response to be controlled to provide an optimum brake feeling.

It is another object of the invention to provide an electrically controlled braking system which allows an optimum braking feeling to be obtained by allowing a brake pedal reaction response to be freely established.

Such object is accomplished in an electrically controlled braking system including a brake pressure generator, means for detecting a stroke of a brake pedal or a pedal depressing force, and control means for controlling a pressure generated by the brake pressure generator in accordance with an input signal from the detecting means, by the addition of a pedal reaction unit which generates a pedal reaction in accordance with the signal from the detecting means and by causing either a pedal reaction response with respect to preset pedal strokes or a pedal stroke response with respect to pedal depressing forces to be stored in the control means so as to allow the pedal reaction to be controlled in accordance with such response. It is a further object of the invention to provide an electrically controlled braking system capable of providing an optimum brake control in accordance with a situation of a vehicle, a running condition of a vehicle or the like.

Such object is accomplished by causing the control means to store a plurality of pedal reaction responses with respect to pedal strokes or to store a plurality of pedal stroke responses with respect to pedal depressing forces so that a suitable one of these responses may be selected.

DETAILED DESCRIPTION OF PREFERRED EMBODIMENTS

Figure 1:
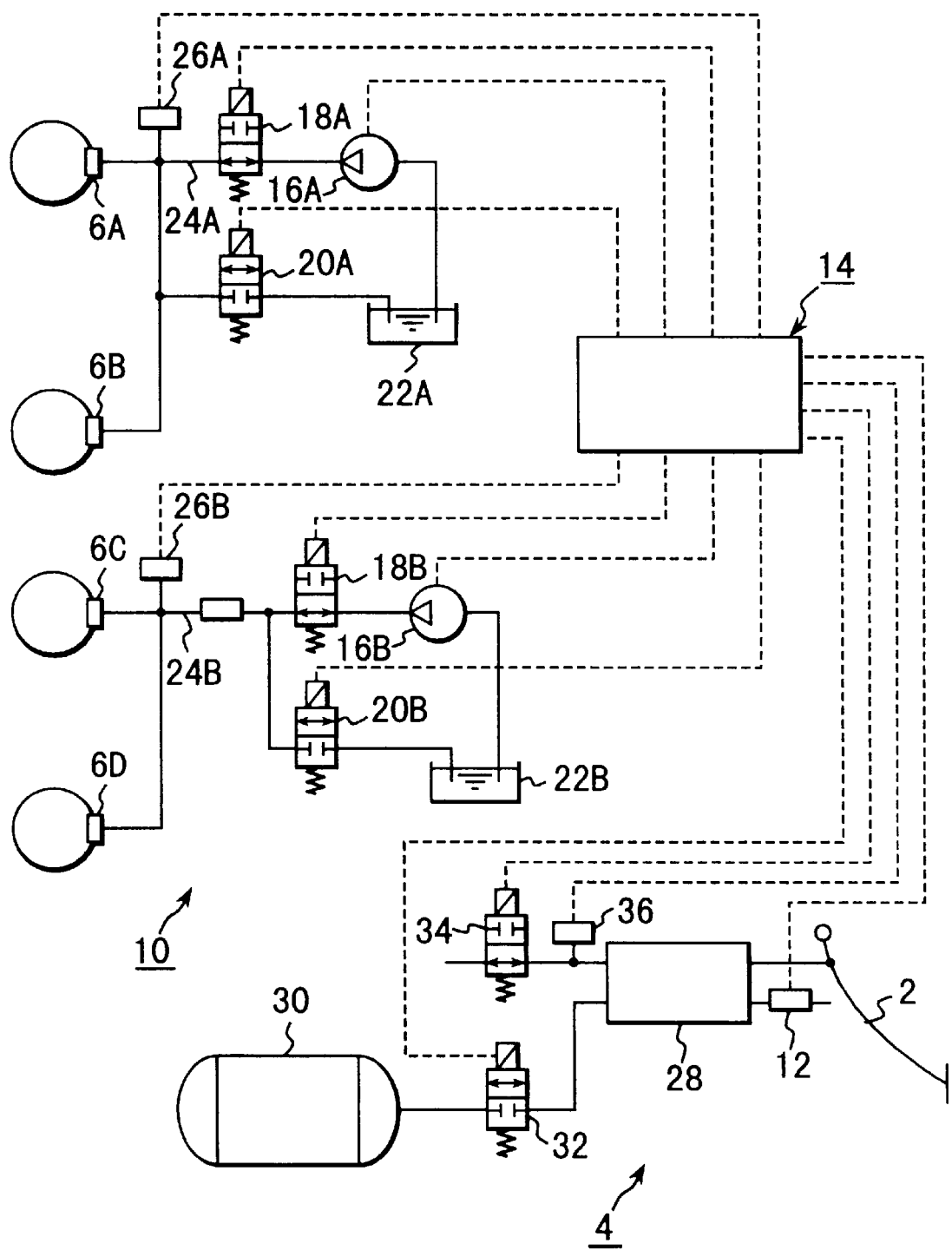
FIG. 1 is a circuit diagram schematically illustrating a general arrangement of an electrically controlled braking system according to one embodiment of the invention.

The invention will be described below with reference to embodiments shown in the drawings. In an embodiment shown in FIG. 1, there is provided a liquid brake pressure generator.

Specifically, the electrically controlled braking system shown comprises a brake reaction unit generally shown by numeral 4 which generates a pedal reaction in response to a depression of a brake pedal 2, a liquid brake pressure generator generally shown by numeral 10 for generating a brake pressure which is fed to wheel cylinders 6A, 6B, 6C and 6D to actuate a brake, and a controller 14 to which a detection signal from a stroke sensor 12 which detects a stroke of the brake pedal 2 is input and which controls the pressure generated by the brake pressure generator 10 and the reaction of the pedal reaction unit 4 in accordance with the detection signal.

As mentioned previously, this embodiment is provided with a liquid brake pressure generator 10. Specifically, an operating liquid which is discharged from each of liquid pressure pumps 16A, 16B associated with the front and the rear wheels, respectively, is fed through liquid pressure feed valves 18A, 18B, respectively, each comprising a solenoid operated open/close valve, to wheel cylinders 6A, 6B and 6C, 6D which are associated with the front wheels and the rear wheels, respectively, thus actuating the brake. The liquid pressure is returned from the wheel cylinders 6A, 6B and 6C, 6D to reservoir 22A, 22B through exhaust valves 20A, 20B, which are formed by solenoid operated open/close valves. The liquid pressure feed valves 18A, 18B and the exhaust valves 20A, 20B are controlled by the controller in a manner to be described later.

Liquid pressure pipings 24A, 24B extend from each of the liquid pressure feed valves 18A and 18B to the wheel cylinders 6A, 6B and 6C, 6D, which are associated with the front wheels and the rear wheels, respectively, and contain pressure sensors 26A, 26B therein which detect the liquid pressure fed to the wheel cylinders 6A to 6D and feed it to the controller 14.

It is to be noted that in FIG. 1, solid lines associated with the brake pressure generator 10 represent liquid pressure piping, solid lines associated with the pedal reaction unit 4 represents air piping, and broken lines joining between the brake pressure generator 10 and the controller 14 and between the pedal reaction unit 4 and the controller 14 represent electrical wiring.

The pedal reaction unit 4 comprises an air cylinder 28 having a piston rod which is connected to the brake pedal 2, an air feed valve (solenoid operated open/close valve) 32 for feeding the air from an air tank 30 into the air cylinder 28, and an exhaust valve (solenoid operated open/close valve) 34 for releasing the air from the air cylinder 28 into the atmosphere. The air feed valve 32 and the exhaust valve 34 are electrically connected to the controller 14 so as to be controlled to be opened or closed in accordance with a signal from the controller 14. The air cylinder 28 is provided with a pressure sensor 36 which detects a pressure produced within the air cylinder 28 and feeds it to the controller 14. The brake pedal 2 has an associated stroke sensor 12 which detects the stroke of the brake pedal 2 and the magnitude of the stroke as the brake pedal 2 is operated. The detected stroke and magnitude of the stroke is then fed to the controller 14. Alternatively, the stroke sensor 12 may detect the stroke of the piston of the air cylinder 28.

The controller 14 drives the liquid pressure pumps 16A, 16B of the brake pressure generator 10 in accordance with the pedal stroke detected by the stroke sensor 12 as the brake pedal 2 is operated, and selectively opens the liquid pressure feed valves 18A, 18B to feed the operating liquid to the wheel cylinders 6A to 6D, thus actuating the brake. On the other hand, the controller 14 opens the air feed valve 32 in accordance with the pedal stroke detected by the stroke sensor 12, thus feeding the air from the air tank 30 into the air cylinder 28 to produce a pedal reaction.

Figure 2:
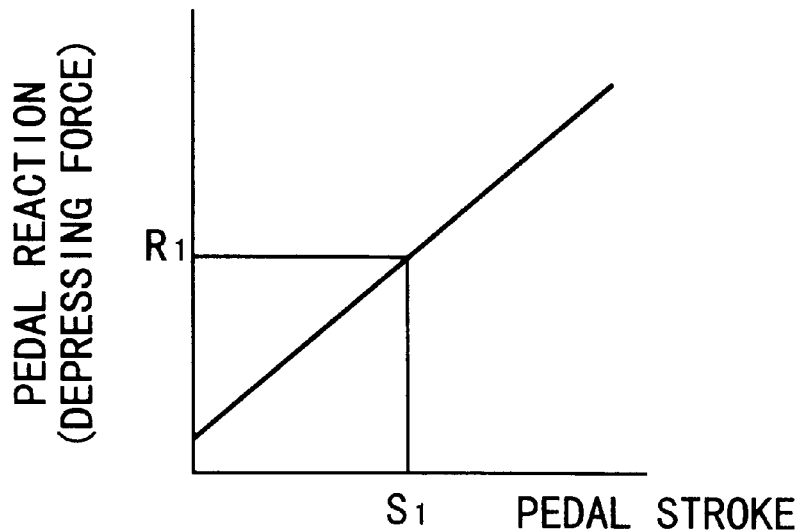
FIG. 2 graphically shows an example of a pedal stroke-pedal reaction response of the electrically controlled braking system.

The operation of the electrically controlled braking system as mentioned above will now be described. As a driver depresses the brake pedal 2, the stroke sensor 12 detects the stroke of the pedal 2 and delivers a detection signal to the controller 14. The controller 14 stores a preset pedal stroke-pedal reaction response and controls the opening or closing of the air feed valve 32 and the exhaust valve 34 such that a pedal reaction which depends on the magnitude of the detected pedal stroke is obtained. For example, when the relationship between the pedal stroke and the pedal reaction is represented by a response as shown in FIG. 2, compressed air from the air tank 30 is introduced into the air cylinder 28 so that a pedal reaction $R_1$ corresponding to a pedal stroke $S_1$ can be obtained.

Figure 3:
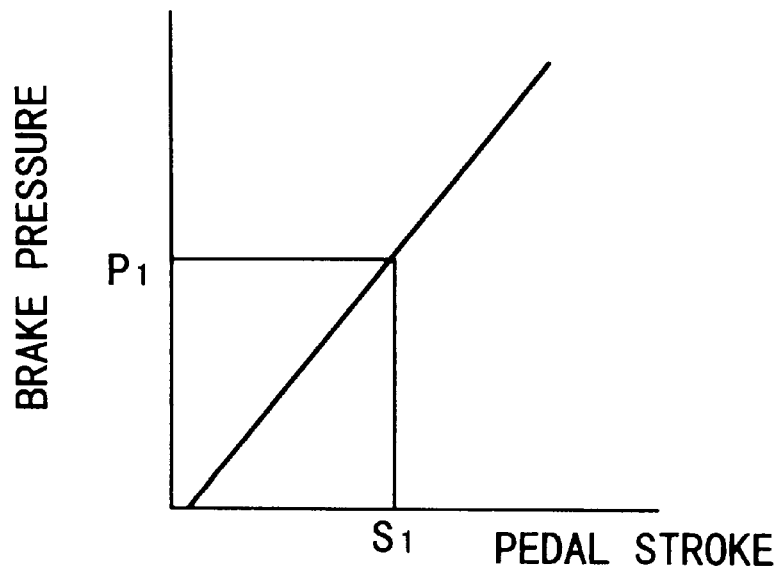
FIG. 3 graphically shows an example of a pedal stroke-brake pressure response of the electrically controlled braking system.

At the same time as the controller 14 controls the pedal reaction unit 4 so that a given pedal reaction can be obtained in accordance with the pedal stroke, the controller 14 also controls the liquid pressure pumps 16A, 16B, the liquid pressure feed valves 18A, 18B and the exhaust valves 20A, 20B so that a brake pressure corresponding to the magnitude of the pedal stroke is obtained in accordance with the stored preset pedal stroke-brake pressure response. For example, when the relationship between the pedal stroke and the brake pressure is as represented by a response shown in FIG. 3, the operating liquid is fed to or displaced from the respective wheel cylinders 6A, 6B, 6C and 6D associated with the front and the rear wheels so that a brake pressure $P_1$ corresponding to a pedal stroke $S_1$ is obtained. It is to be understood that the relationship between the pedal stroke and the pedal reaction and the relationship between the pedal stroke and the brake pressure are not limited to ones in which the pedal reaction or the brake pressure linearly changes with respect to a change in the pedal stroke, as illustrated in FIGS. 2 and 3, but an arbitrary response can be chosen for these relationships such as responses having a break point or including a curvilinear change.

With a conventional electrically controlled braking system, it has been possible to control a relationship between the pedal stroke and the brake pressure (or deceleration) by detecting the stroke of the brake pedal 2 by the stroke sensor 12, and by controlling the liquid pressure generated by the brake pressure generator 10 by the controller 14 in accordance with the detection signal. However, no control has been provided over the relationship between the pedal stroke and the pedal reaction (depressing force). Accordingly, the brake feeling which is determined by three factors including the pedal stroke, the pedal depressing force and the brake pressure cannot be made optimal, as mentioned previously. However, in the present embodiment, the brake or pedal reaction unit 4 is added to the conventional arrangement, and the air pressure fed from the air tank 30 to the air cylinder 28 is regulated in accordance with the magnitude of the pedal stroke which is detected by the stroke sensor 12, thereby allowing the pedal reaction to be controlled in a desired manner with respect to the operation of the brake pedal 2. In this manner, an optimum brake feeling can be obtained.

In the pedal reaction unit 4 of the first embodiment, the stroke sensor 12 which detects the pedal stroke is provided, and the pedal reaction is controlled by the controller 14 in accordance with the detection signal from the stroke sensor 12. However, conversely, there may be provided a depressing force sensor, and the magnitude of the pedal stroke may be determined in accordance with the magnitude of the detected depressing force.

Figure 4:
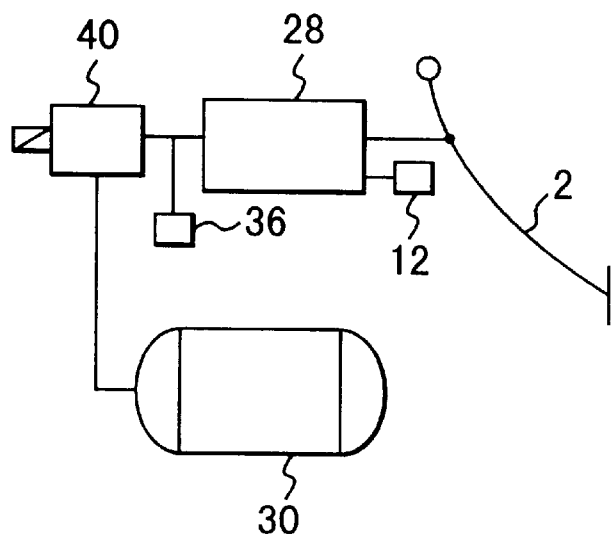
FIGS. 4 to 7 are schematic views of several other forms of pedal reaction units.
Figure 5:
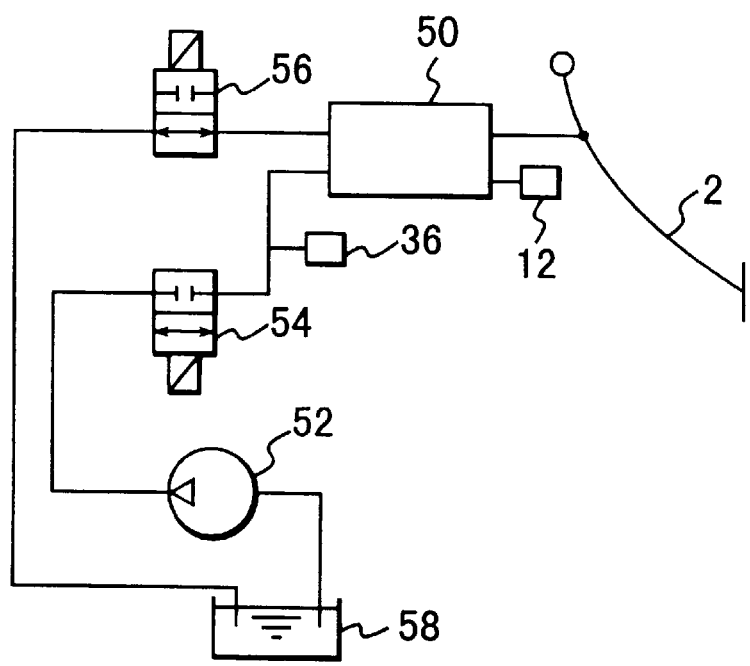
Figure 6:
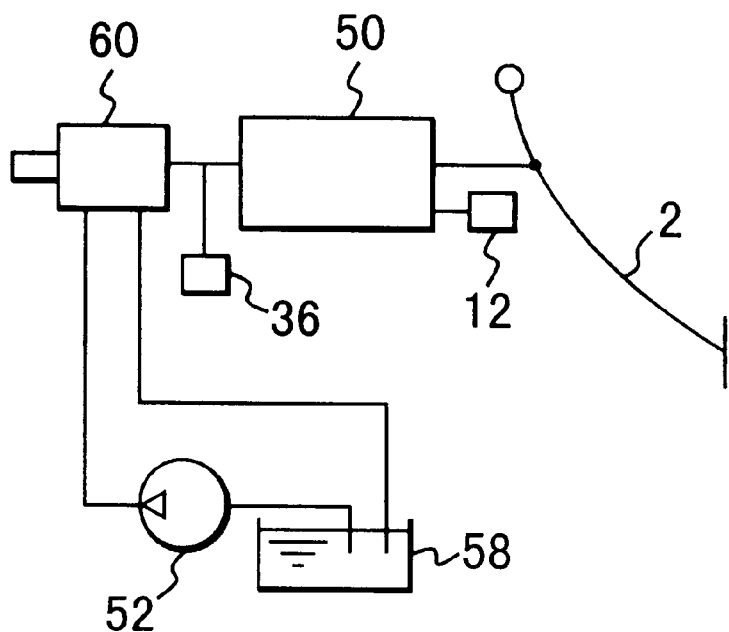

In the first embodiment, the pedal reaction unit 4 comprises the air cylinder 28 and the pair of solenoid operated open/close valves (air feed valve 32 and exhaust valve 34), but it is not limited to such combination, but may be constructed in a different manner. For example, the air may be fed to or displaced from the air cylinder 28 through a proportional solenoid valve 40 which produces an air pressure in accordance with a voltage or current, as shown in FIG. 4. It is to be understood that in FIGS. 4 to 7, similar parts to those shown in the pedal reaction unit 4 of FIG. 1 are designated by like reference numerals and characters as used before.

Figure 7:
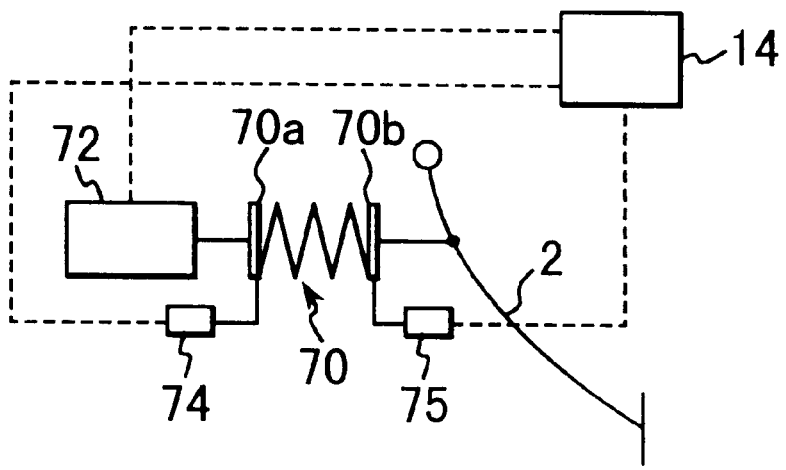

Alternatively, the air cylinder 28 which produces a pedal reaction may be replaced by a liquid pressure cylinder 50, to which the operating liquid discharged from a liquid pressure pump 52 is fed through a liquid pressure feed valve 54 comprising a solenoid operated open/close valve, and may be returned to a reservoir 58 through an exhaust valve 56 comprising a solenoid operated open/close valve. In addition, when the liquid pressure cylinder 50 is used, the pair of solenoid operated open/close valves may be replaced by a proportional solenoid valve 60 (see FIG. 6). As shown in FIG. 7, a pedal reaction generator using a spring 70 may also be used in this instance. One end 70a of the spring 70 is arranged to be movable by the action of a stepping motor 72 while the other end 70b is connected to the brake pedal 2. The opposite ends 70a, 70b of the spring 70 are provided with stroke sensors 74, 75, respectively, so that the deflection of the spring 70 as the brake pedal 2 is operated can be detected. The preset length of the spring 70 can be made to change in accordance with the magnitude of the stroke of the brake pedal 2.

The embodiment shown in FIG. 1 only comprises a normal brake, but ABS and TRC may be added to this arrangement. In the arrangement of FIG. 1, the front wheels and the rear wheels are each associated with a single liquid pressure pump (16A or 16B) a liquid pressure feed valve (18A or 18B) and an exhaust valve (20A or 20B) each valve comprising solenoid operated open/close valve, so that a common liquid pressure is introduced into the front left and right wheel cylinders 6A, 6B and into the rear left and right wheel cylinders 6C, 6D. However, each wheel cylinder 106 may be associated with a single liquid pressure pump 116 and a pair of solenoid operated open/close valves 118, 120 so that a liquid pressure can be fed to or displaced from each wheel cylinder 106 independently, as shown in FIG. 8, thus allowing the ABS and the TRC functions to be added.

When such an arrangement is made, the resulting arrangement operates in the similar manner during a normal braking operation as described above in connection with FIG. 1, and in addition, whenever either wheel tends to be locked during the operation of the brake, the ABS control takes place. Specifically, by controlling the pump 116, the liquid pressure feed valve 118 and the exhaust valve 120 which, in combination, feed the liquid pressure to the wheel cylinder 106 associated with the wheel which tends to be locked, the locking tendency of this wheel can be removed by maintaining the liquid pressure in the wheel cylinder 106, or by performing a decompressing control which occurs by displacing the operating liquid or an intensifying control which occurs by feeding the operating liquid. Whenever a driving wheel tends to slip upon starting a vehicle, TRC control takes place by applying a braking action to the wheel which tends to slip, by controlling the liquid pressure pump 116, the liquid pressure feed valve 118 and the exhaust valve 120 associated with the wheel which tends to slip, thus removing the slipping tendency.

Figure 8:
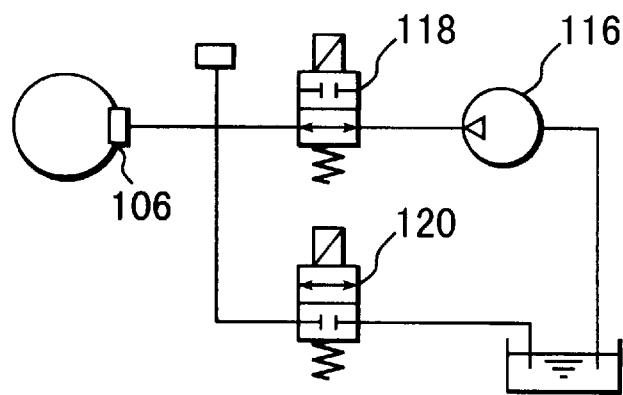
FIG. 8 is a schematic diagram of a modification of a brake pressure generator of the first embodiment.
Figure 9:
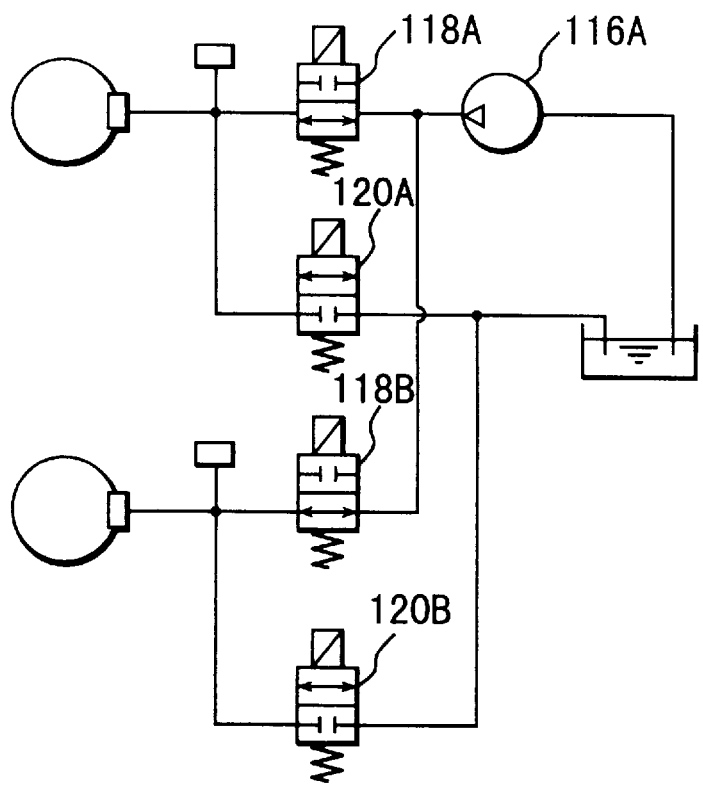
FIG. 9 is a schematic diagram of another modification of the brake pressure generator of the first embodiment.

While the pump 116, the liquid pressure feed valve 118 and the exhaust valve 120 are provided for each wheel in the arrangement of FIG. 8, alternatively, a single pump 116A may be associated with each of the front wheel side and the rear wheel side while each wheel may be associated with a liquid pressure feed valve (118A or 118B) and an exhaust valve (120A or 120B) as shown in FIG. 9. It is to be noted that FIG. 9 shows the arrangement for only the front wheels, but a similar arrangement is provided for the rear wheels also.

A switching between the responses during the actuation of the brake may take place by effecting the switching between the brake pedal reaction responses which govern the relationships between the pedal stroke and the pedal reaction (depressing force) as exemplified above, or alternatively in addition to the relationship between the pedal stroke and the pedal reaction (depressing force), a switching between the brake pressure responses which govern the relationships between the pedal stroke and the brake pressure may take place simultaneously.

Figure 29:
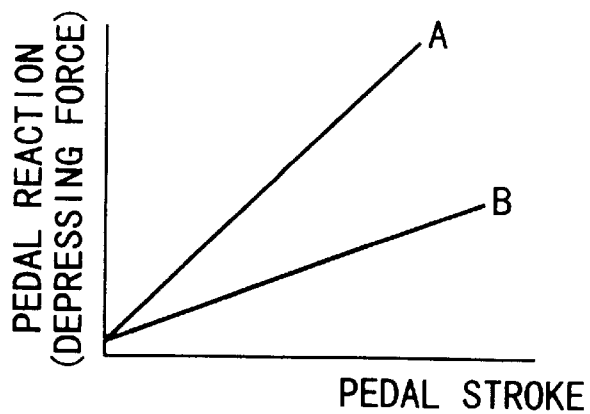
FIG. 29 graphically shows a pair of pedal reaction responses between which a switching takes place in accordance with each of the flow charts.
Figure 25:
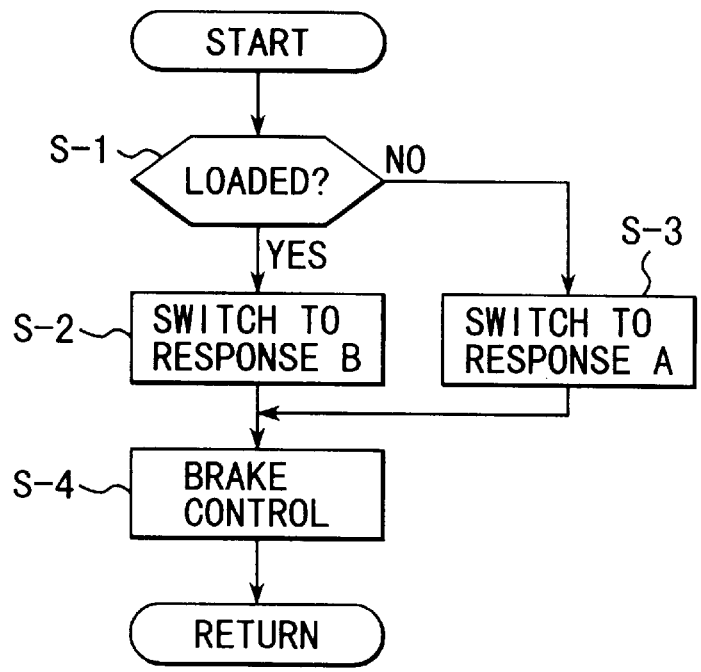
FIG. 25 is a flow chart showing an example of a control when switching between pedal reaction responses.
Figure 26:
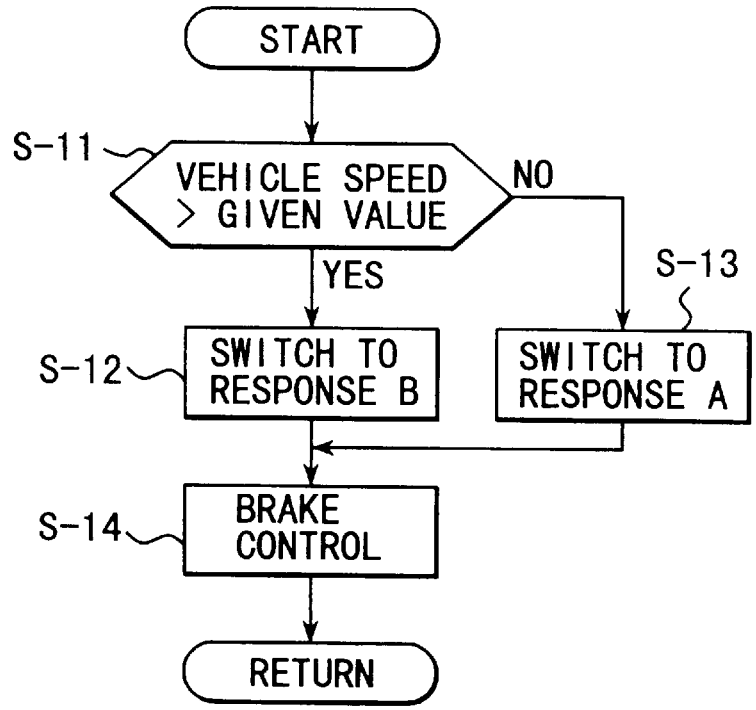
FIG. 26 is a flow chart showing another example of a control when switching between pedal reaction responses.

FIG. 26 shows a control flow when switching between the brake pedal reaction responses in accordance with the vehicle speed. Specifically, the controller 214 determines whether a vehicle speed as detected by a vehicle speed sensor has exceeded a given value (S-11), and if it is determined that the running speed is above the given value, a switching to the response B shown in FIG. 29 occurs (S-12). If it is determined that the running speed is below the given value, a switching to the response A occurs (S-13). The brake pedal reaction is controlled in accordance with the selected response (S-14). A wheel speed sensor as used in the ABS may be used as the vehicle speed sensor.

Figure 27:
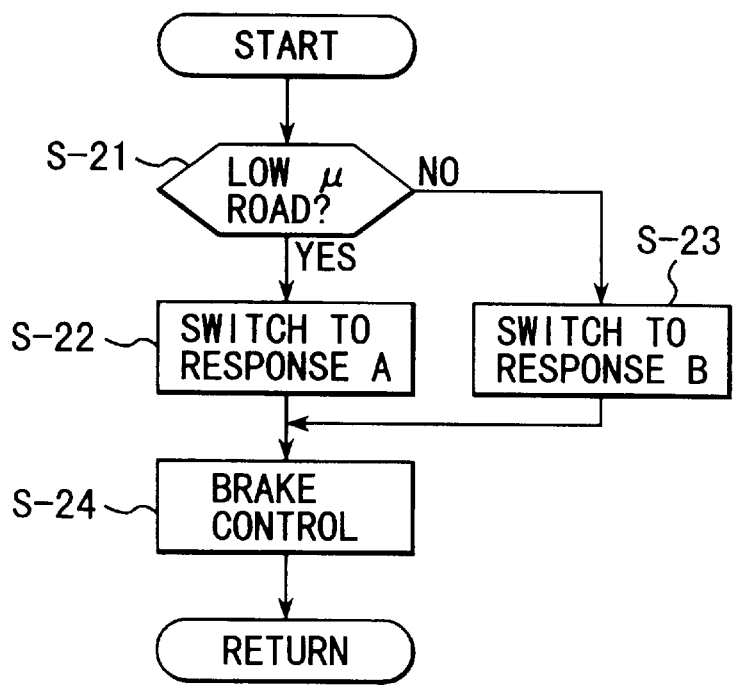
FIG. 27 is a flow chart showing a further example of a control when switching between pedal reaction responses.

FIG. 27 shows a control flow when switching between the brake pedal reaction responses in accordance with the road surface condition. Initially, it is determined whether or not the coefficient of friction ($\mu$) between the tire and road surface is equal to or below a given value (S-21). If it is determined that the coefficient friction is low, a switching to the response A occurs (S-22). Conversely, when it is determined that the coefficient of friction is high, a switching to the response B occurs (S-23). The brake pedal reaction is controlled in accordance with the respective response (S-24). A determination of whether or not the road has a low coefficient of friction is made as indicated below. For example, 1) a wheel speed sensor which is provided for use in the ABS control is used to detect a rate of recovery of the wheel speed when the ABS is activated, and if the recovery of the wheel speed is rapid, it is determined that the friction of coefficient ($\mu$) is high while when the recovery of the wheel speed is retarded, the coefficient of friction is determined to be low. Alternatively, 2) the coefficient of friction is determined from a speed difference between front and rear wheels when decelerating the wheels. If there is a high speed difference between the front and rear wheels, the coefficient of friction ($\mu$) is high while when the speed difference is low, the coefficient of friction is low. As a further alternative, 3) the coefficient of friction may be determined on the basis of length of the decompressing interval when activating the ABS control. Thus, if the decompressing interval continues long, the coefficient of friction ($\mu$) is low, while when the decompressing interval is short, it is determined that the coefficient of friction ($\mu$) is high.

Figure 28:
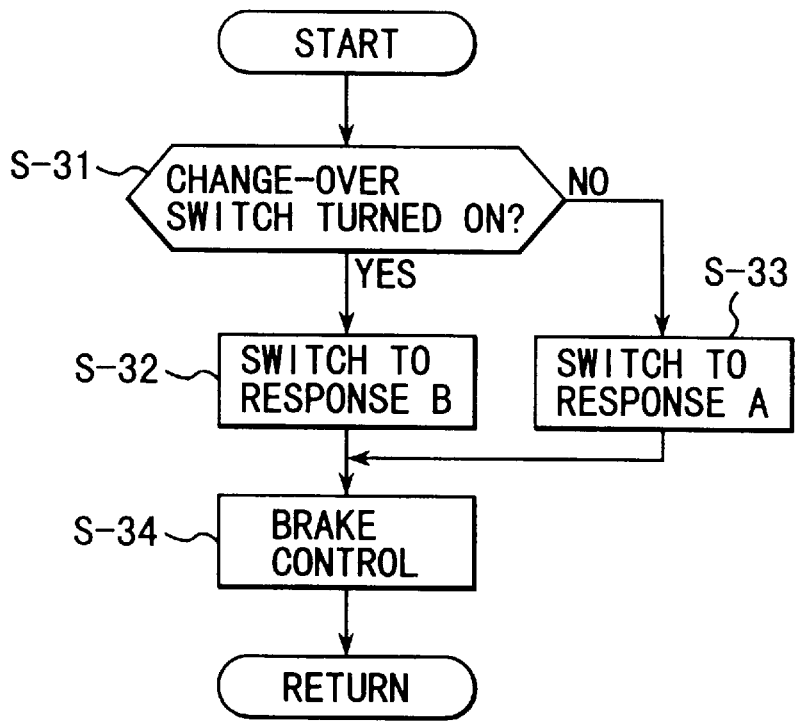
FIG. 28 is a flow chart showing still another example of a control when switching between pedal reaction responses.

FIG. 28 shows a control flow when a switching between responses is made by operating a change-over switch according to the intention of a driver. In this instance, it is determined whether or not the change-over switch is turned on (S-31). If YES, a switching to the response B occurs (S-32), but if NO, a switching to the response A occurs (S-33). The pedal reaction during the actuation of the brake is controlled in accordance with either one of these responses (S-34).

As described, when a plurality of pedal stroke—pedal reaction (depressing force) responses or pedal depressing force—pedal stroke responses which govern the control over the brake pedal reaction are stored in the controller 214, and the brake pedal reaction is controlled by selecting one from the plurality of responses in accordance with the vehicle condition, the road surface condition or other requirement, a brake control which is optimum corresponding to the condition can be performed. A more preferred brake feeling can be obtained when, in addition to the pedal stroke—pedal reaction (depressing force) responses or the pedal depressing force—pedal stroke responses which govern the control over the brake pedal reaction, a plurality of the pedal stroke—brake pressure responses or pedal depressing force—brake pressure responses are also stored in the controller 214 and one of them is selected in accordance with the condition encountered to perform the brake control.

As described above, when a plurality of responses are stored in the controller 214, and one of them is selected depending on the condition or situation encountered to perform a brake control in accordance with the selected response, a brake feeling which is most preferred to the particular vehicle can be obtained. However, for a vehicle of a different variety, it is necessary to provide a controller which stores a plurality of different responses. Thus, it becomes necessary that a plurality of controllers be provided which store different responses in accordance with the variety of vehicles. In such instance, a variety of responses which depend on the variety of vehicles may be stored in the single controller, and only those responses which correspond to the variety of a particular vehicle on which the controller is mounted may be selected, thus allowing a single controller to accommodate a variety of vehicles.

Figure 30:
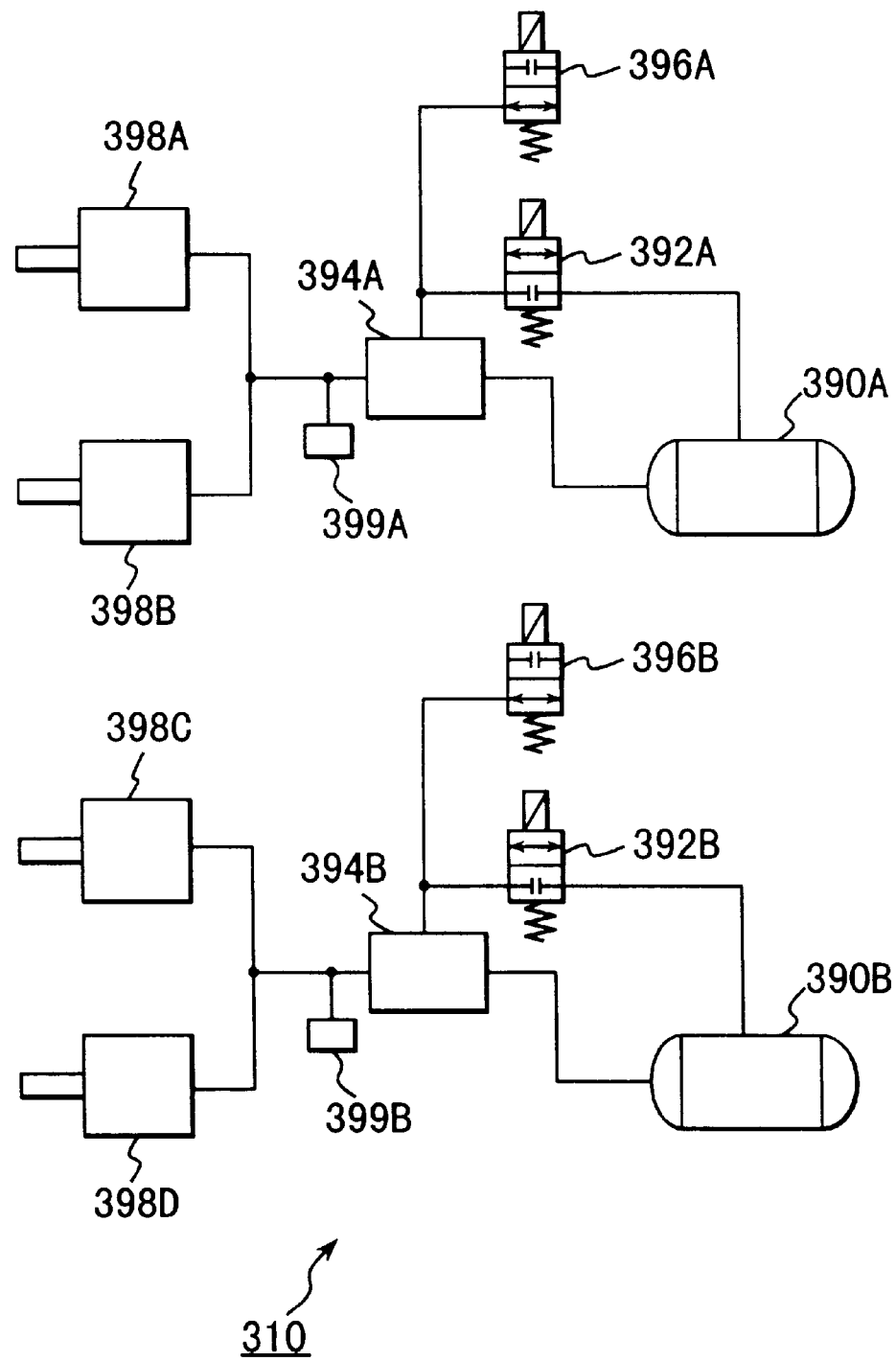
FIG. 30 is a circuit diagram schematically illustrating the general arrangement of an electrically controlled braking system according to a third embodiment of the invention.
Figure 31:
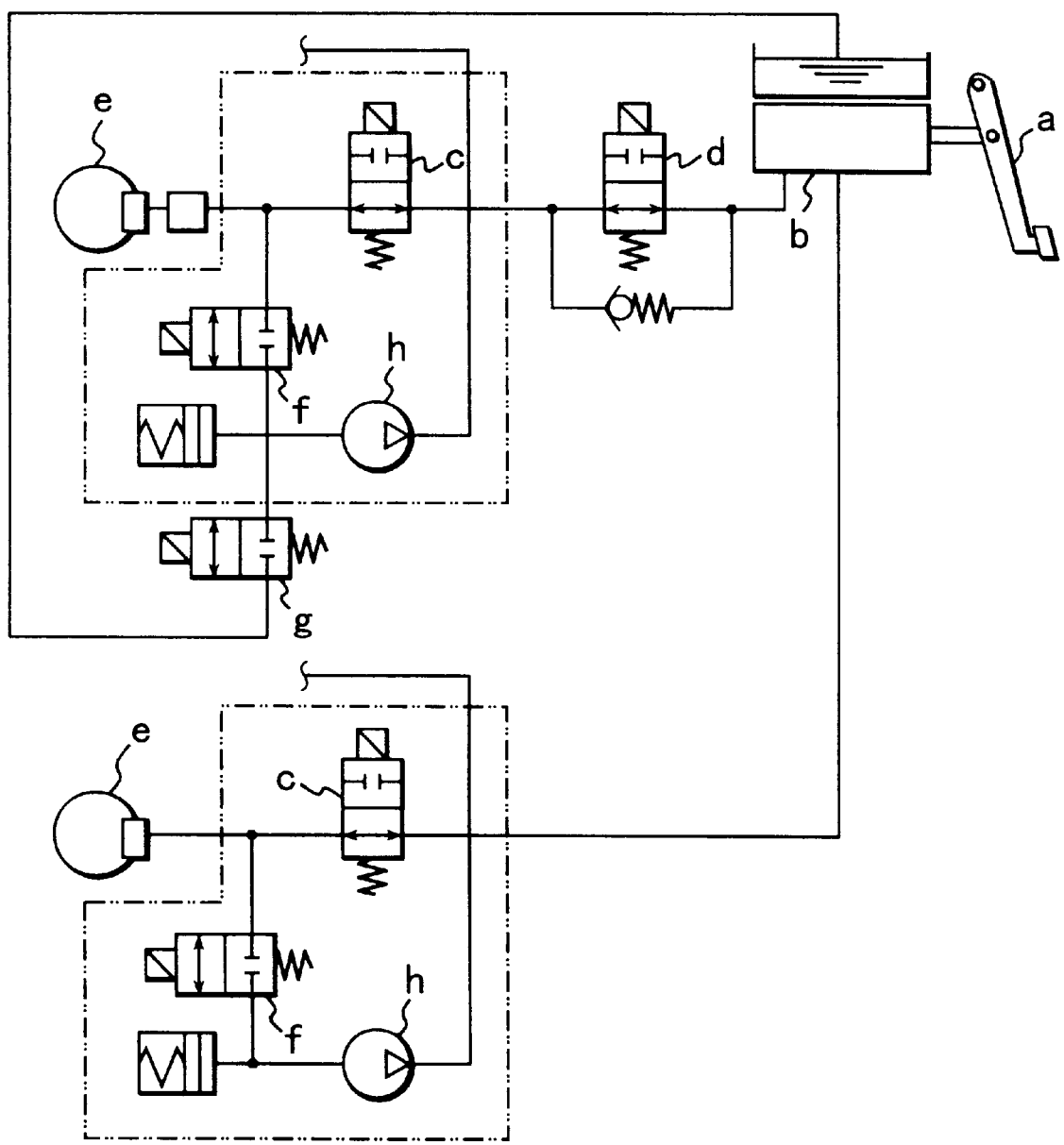
FIG. 31 is a circuit diagram of an example of a conventional liquid pressure braking system.
Figure 32:
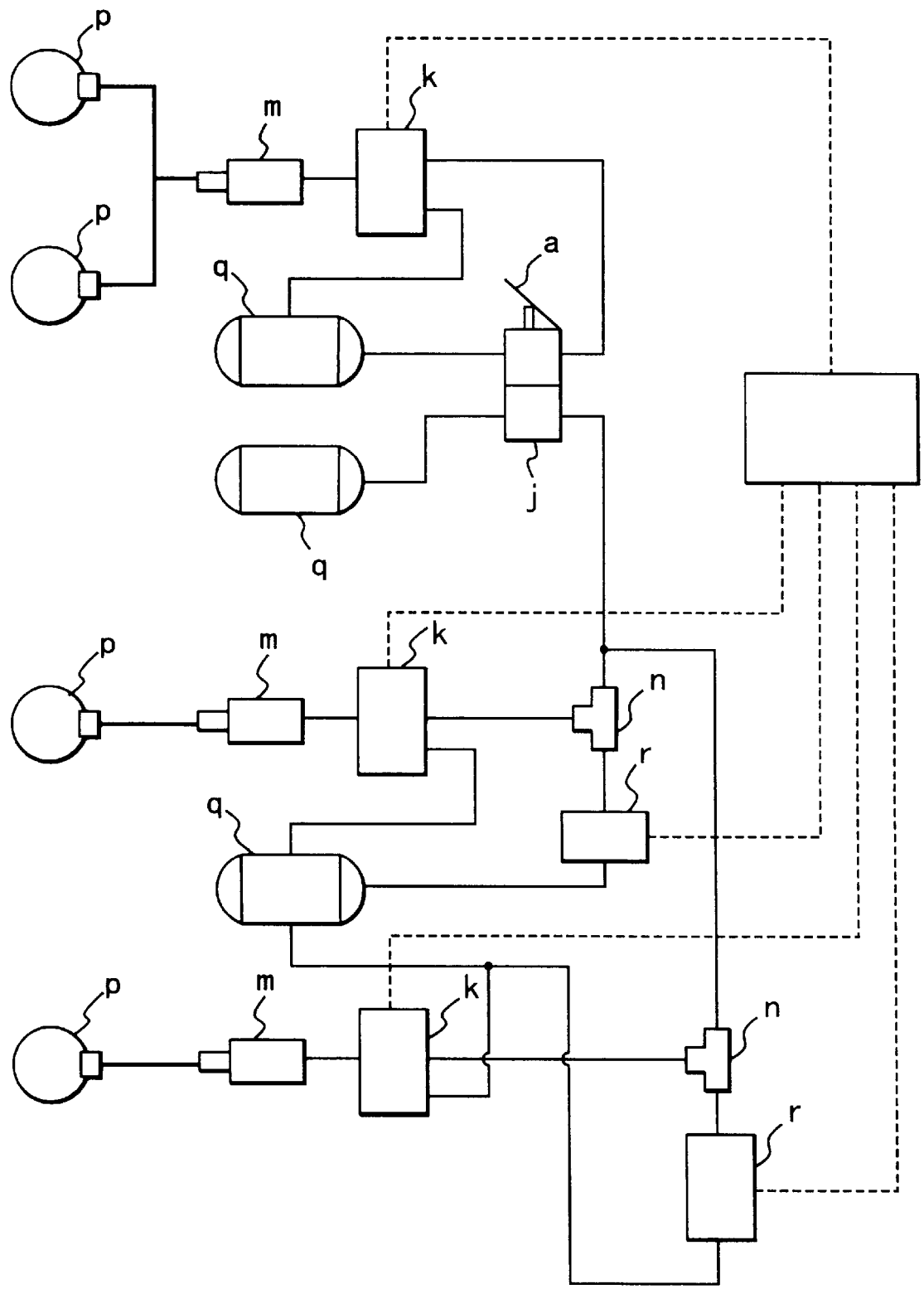
FIG. 32 is a circuit diagram of an example of a conventional air-over hydraulic braking system.
Figure 33:
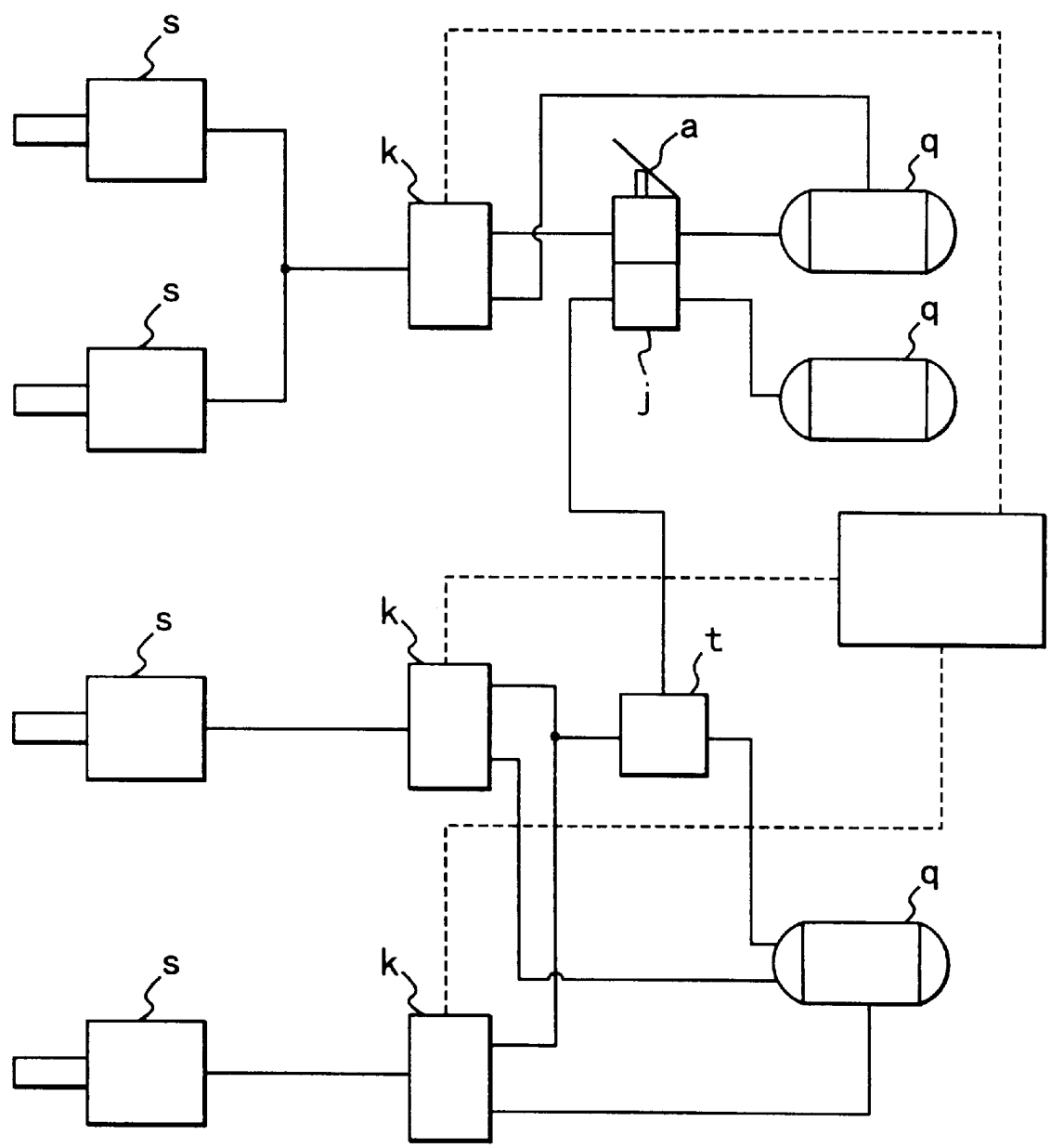
FIG. 33 is a circuit diagram of an example of a conventional full air brake system.
Figure 34:
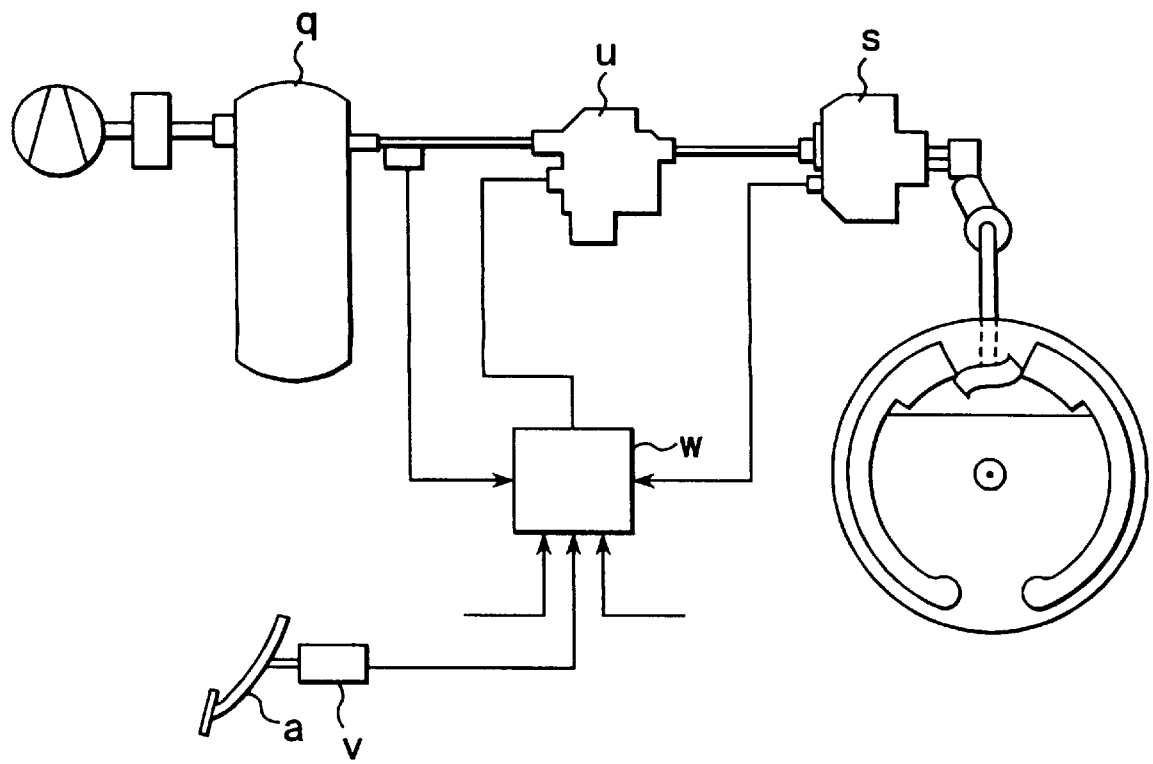
FIG. 34 is a circuit diagram of an example of a conventional electrically controlled braking system.

FIG. 30 shows a further embodiment in which a brake pressure generator 310 of a full air brake type is used. Air tanks 390A, 390B associated with the front wheels and the rear wheels, respectively, are connected through air feed valves (solenoid operated open/close valves) 392A, 392B, respectively, to control chambers of relay valves 394A, 394B, respectively. These control chambers can be released into the atmosphere through exhaust valves (solenoid operated open/close valves) 396A, 396B. The air feed valves 392A, 392B and the exhaust valves 396A, 396B are controlled to be opened or closed in response to a signal from a controller, not shown, thus introducing a control pressure into the control chambers of the relay valves 394A, 394B. When the relay valves 394A, 394B are switched by the air pressure introduced into the control chambers, a connection is established between the inlets and the outlets of the relay valves 394A, 394B, whereby the compressed air from the air tanks 390A, 390B are fed to brake cylinders 398A, 398B, 398C, 398D. The brake pressures fed to the brake cylinders 398A, 398B, 398C, 398D through the relay valves 394A, 394B are detected by the pressure sensors 399A, 399B, and detected pressures are fed to the controller. It will be noted that in this embodiment, the same arrangement is used for the front and the rear wheels.

Figure 10:
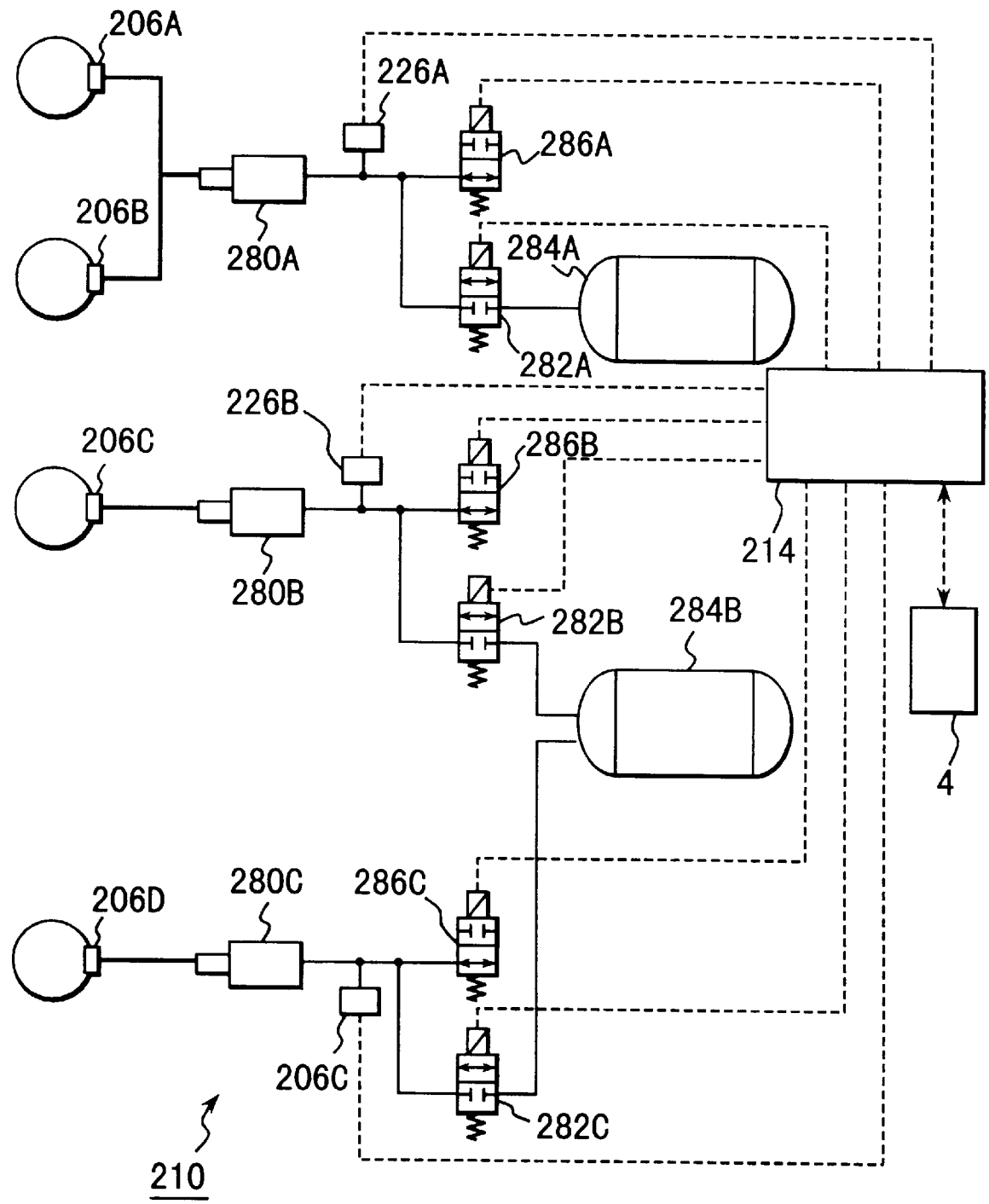
FIG. 10 is a circuit diagram schematically illustrating the general arrangement of an electrically controlled braking system according to a second embodiment of the invention.
Figure 11:
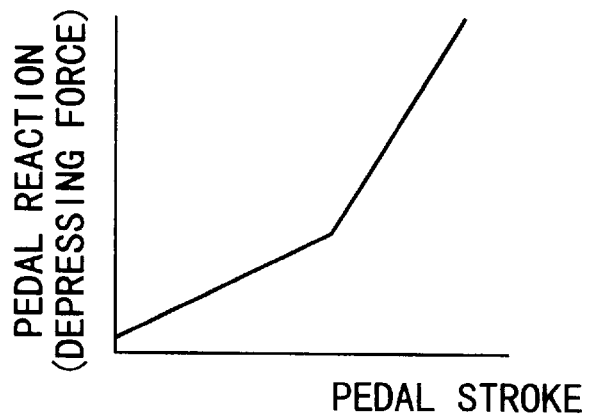
FIGS. 11 to 17 graphically show other examples of pedal reaction responses.
Figure 12:
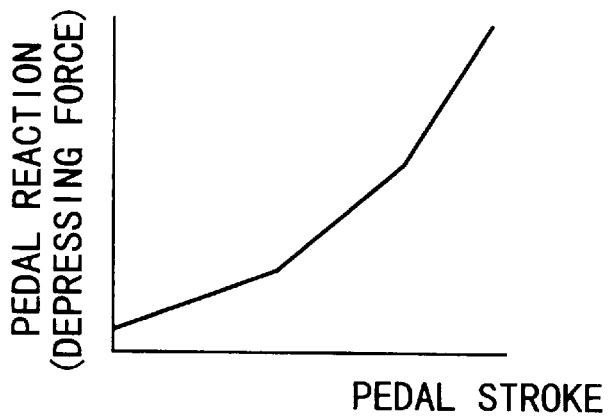
Figure 13:
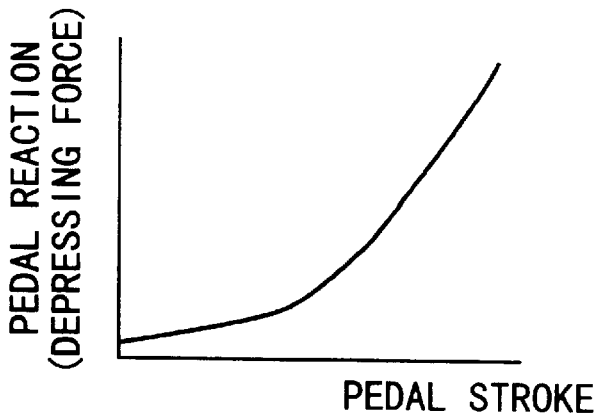
Figure 14:
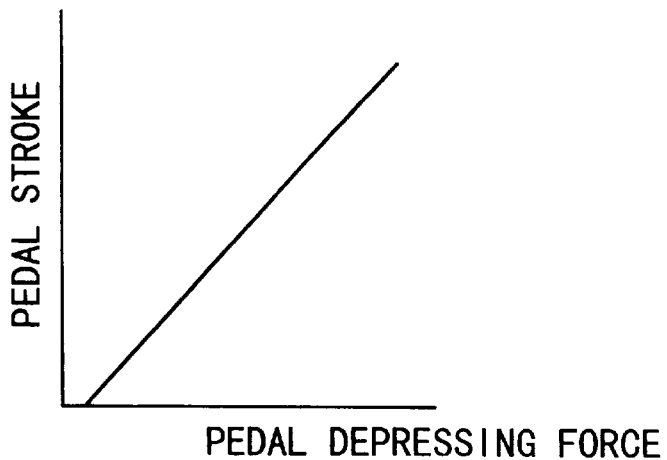
Figure 15:
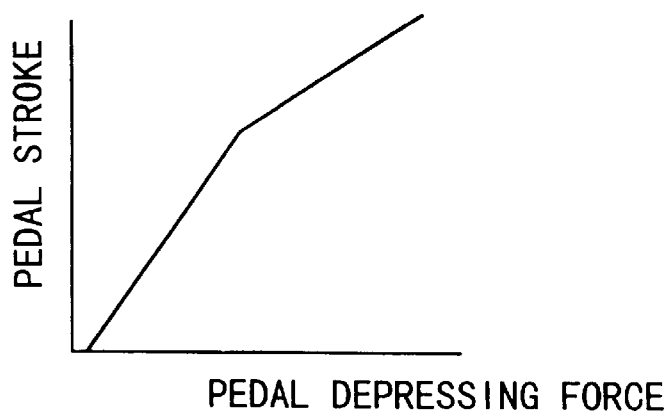
Figure 16:
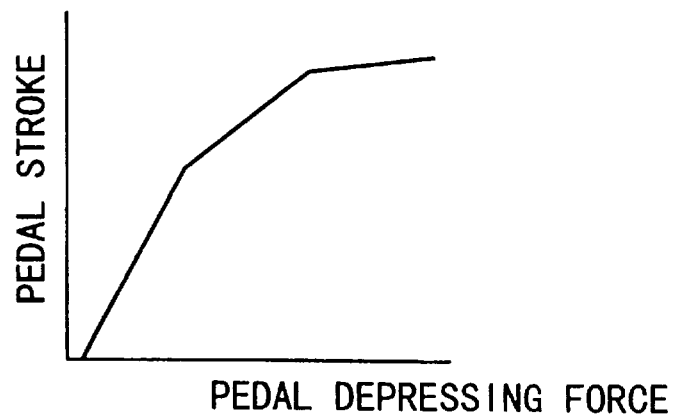
Figure 17:
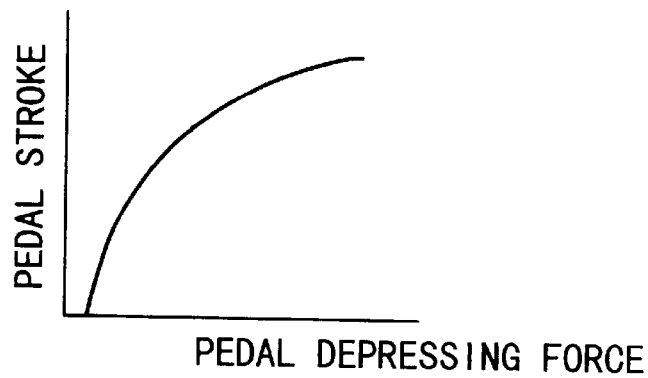
Figure 18:
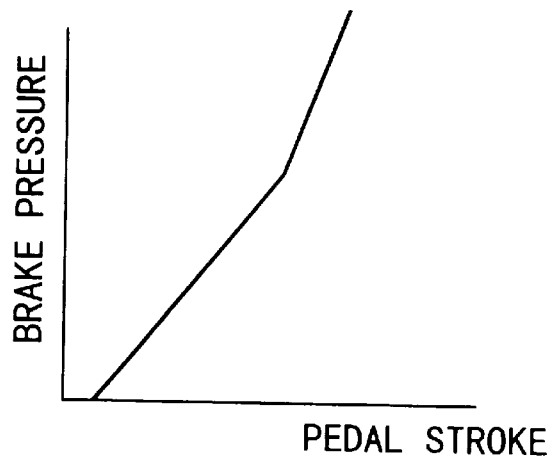
FIGS. 18 to 24 graphically show other examples of brake pressure responses.
Figure 19:
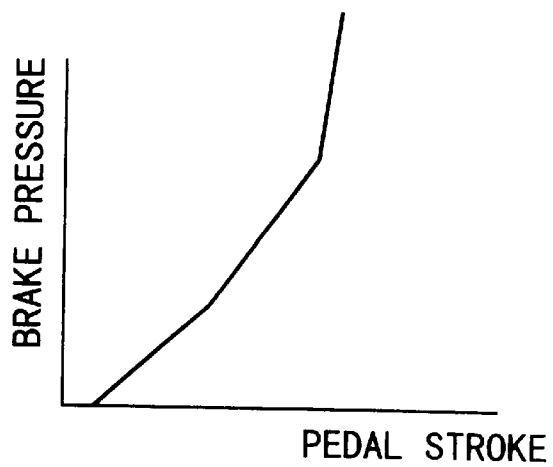
Figure 20:
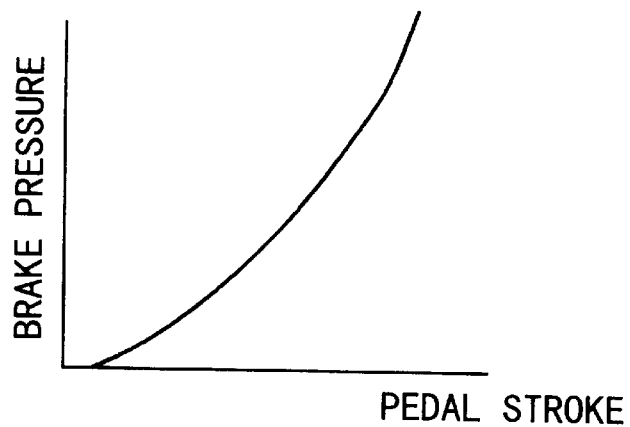
Figure 21:
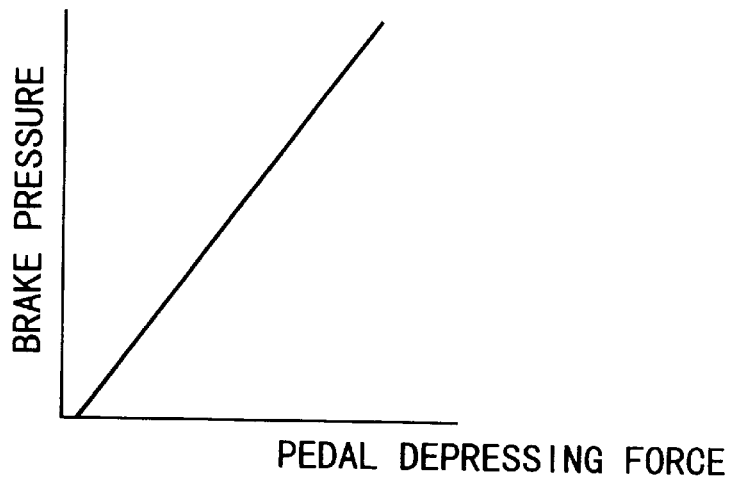
Figure 22:
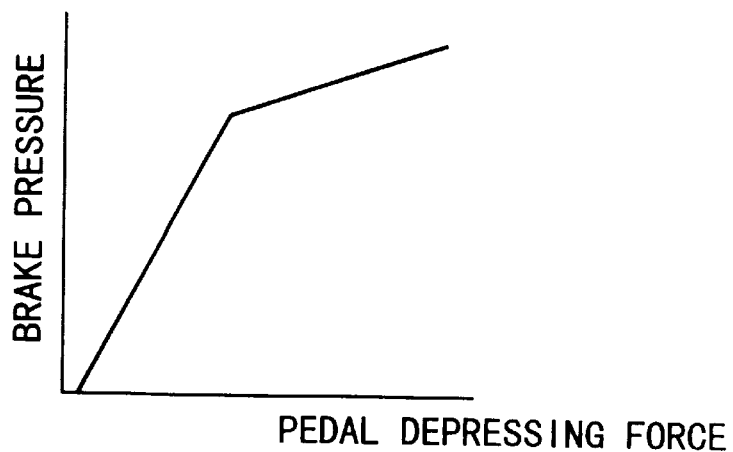
Figure 23:
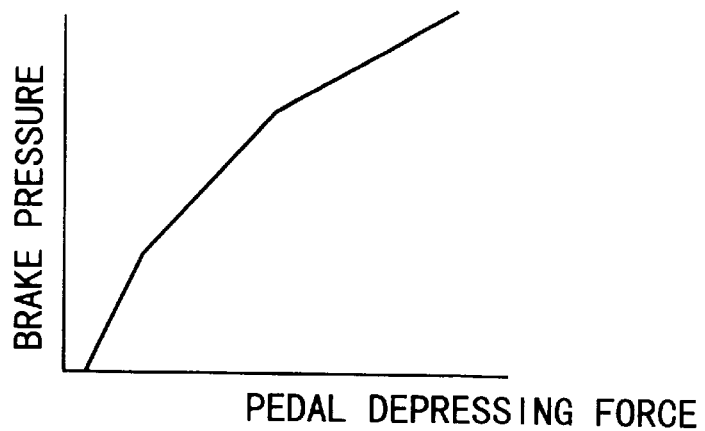
Figure 24:
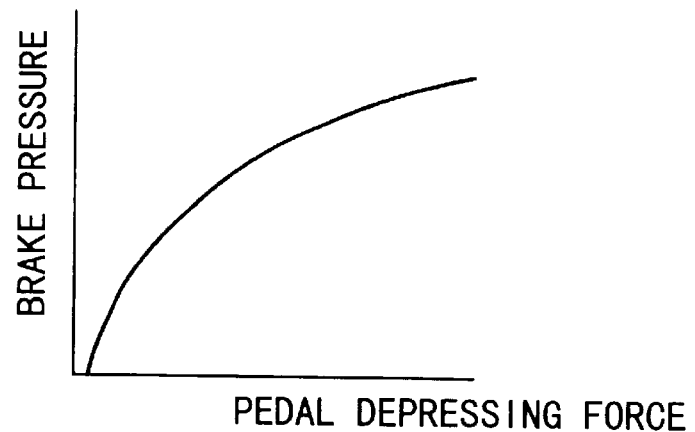

The embodiment thus constructed operates in the similar manner as the air-over hydraulic brake during the normal operation of the brake, and also operates similarly as the arrangement shown in FIG. 10 during the activation of the ABS control. Again, an optimum brake feeling can be obtained in this embodiment by controlling the pedal stroke, the pedal depressing force and the brake pressure in the similar manner as described in connection with previous embodiments.

What is claimed is:

1. An electrically controlled braking system comprising a brake pressure generator for producing a brake pressure to wheel cylinders, detect means for detecting the magnitude of a stroke of a brake pedal or a pedal depressing force, and control means for controlling said brake pressure generator in accordance with an output signal from said detect means;
a brake pedal reaction unit for producing a pedal reaction in response to an operation of the brake pedal, and
said control means being configured to control said brake pedal reaction unit in accordance with the output signal from said detect means so as to control the pedal reaction.

2. An electrically controlled braking system according to claim 1 in which the brake pressure generator comprises a pump for producing a liquid pressure, and a solenoid valve for controlling said liquid pressure.

3. An electrically controlled braking system according to claim 1 in which the brake pressure generator comprises an air-over hydraulic braking system.

4. An electrically controlled braking system according to claim 1 in which the brake pressure generator comprises a full air braking system.

5. An electrically controlled braking system according to claim 1 in which the pedal reaction unit comprises an air cylinder, and a pair of solenoid operated open/close valves for feeding air to or displacing air from the air cylinder.

6. An electrically controlled braking system according to claim 1 in which the pedal reaction unit comprises an air cylinder, and a propotional solenoid valve which feeds air to or displacing air from the air cylinder.

7. An electrically controlled braking system according to claim 1 in which the pedal reaction unit comprises a pressure cylinder connected to said brake pedal, a pressure source, and a pressure control valve which controls a pressure from said pressure source so as to supply the pressure to said pressure cylinder.

8. An electrically controlled braking system according to claim 1 in which the pedal reaction unit comprises a liquid pressure cylinder, and a proportional solenoid valve for feeding an operating liquid to or displacing operating liquid from the liquid pressure cylinder.

9. An electrically controlled braking system according to claim 1 in which the pedal reaction unit comprises a spring, a stepping motor for changing a preset length of the spring, and means for detecting the positions of opposite ends of the spring.

10. An electrically controlled braking system according to claim 1 in which the detect means detects the magnitude of the stroke of the brake pedal, and the control means controls the pedal reaction in accordance with the output signal from the detect means as to the magnitude of the stroke.

11. An electrically controlled braking system according to claim 1 in which the detect means detects the pedal depressing force, and the control means controls the pedal reaction in accordance with the output signal from the detect means as to the pedal depressing force.

12. An electrically controlled braking system comprising a brake pressure generator for producing a brake pressure to wheel cylinders, detect means for detecting the magnitude of a stroke of a brake pedal or a pedal depressing force, and control means for controlling said brake pressure by controlling said brake pressure generator in accordance with an output signal from said detect means; and
a brake pedal reaction unit for producing a pedal reaction in response to an operation of the brake pedal,
wherein said control means which stores a preset pedal stroke—pedal reaction response or a pedal depressing force—pedal stroke response controls said brake pedal reaction unit on the basis of such response so as to obtain said stored pedal reaction.

13. An electrically controlled braking system according to claim 12 in which the control means stores a preset pedal stroke—brake pressure response or pedal depressing force—brake pressure response and controls the brake pressure generator on the basis of such response.

14. An electrically controlled braking system according to claim 12 in which the control means stores a plurality of preset pedal stroke—pedal reaction responses or pedal depressing force—pedal stroke responses, one of the stored responses being selectable in response to the output signal.

15. An electrically controlled braking system according to claim 12 in which the control means stores a plurality of pedal stroke—pedal reaction responses or a plurality of pedal depressing force—pedal reaction responses, and a plurality of pedal stroke—brake pressure responses or a plurality of pedal depressing force—brake pressure responses as to said brake pressure generator, one each of the responses as to the pedal reaction unit and responses as to the brake pressure generator being selectable in response to the output signal.

16. An electrically controlled braking system according to claim 15 in which the control means stores a plurality of responses as to the brake pedal reaction unit and a plurality of responses as to the brake pressure generator which depend on a plurality of varieties of vehicles, either one of responses of the pedal reaction unit and responses of the brake pressure generator being selected depending on the variety of a particular vehicle on which the electrically controlled braking system is mounted.

17. An electrically controlled braking system according to claim 7 in which said pressure cylinder comprises a liquid pressure cylinder, and said pressure source comprises a liquid pressure source.

18. An electrically controlled braking system according to claim 12 in which the brake pedal reaction unit comprises an air cylinder and said brake pressure generator comprises liquid pressure pumps and liquid pressure feed valves.

19. An electrically controlled braking system according to claim 12 in which the brake pedal reaction unit comprises an air cylinder, an air tank, and a proportional solenoid valve.

20. An electrically controlled braking system according to claim 12 in which said brake pedal reaction unit comprises a liquid pressure cylinder, a liquid pressure pump, a liquid pressure feed valve, an exhaust valve and a reservoir.

21. An electrically controlled braking system according to claim 12 in which said brake pedal reaction unit comprises a liquid pressure cylinder and a proportional solenoid valve connected to a liquid pressure pump and a reservoir.

22. An electrically controlled braking system comprising:
   a brake pressure generator including pressure pumps, pressure feed valves, and exhaust valves;
   means for detecting a pedal stroke of a brake pedal or a pedal depressing force as the brake pedal is operated;
   a controller for driving the pressure pumps and controlling the valves of the brake pressure generator to apply pressure to wheel cylinders and control vehicle braking in accordance with the detected pedal stroke or the pedal depressing force; and
   a pedal reaction unit comprising:
      an air cylinder connected to the brake pedal;
      an air tank for providing air to said air cylinder;
      an air feed valve for controlling air provided by said air tank to said air cylinder;
      an exhaust valve for releasing air from said air cylinder; and
      a pressure sensor for detecting a pressure produced within said air cylinder and feeding the detected pressure to said controller,
   wherein said controller controls said air feed valve and said exhaust valve to produce a pedal reaction in accordance with the detected pedal stroke or the pedal depressing force.

* * * * *